United States Patent
Jiang et al.

(10) Patent No.: US 8,417,475 B2
(45) Date of Patent: Apr. 9, 2013

(54) ELASTICITY IMAGING DEVICE WITH IMPROVED CHARACTERIZATION OF SEED DISPLACEMENT CALCULATIONS

(75) Inventors: Jingfeng Jiang, Madison, WI (US); Timothy J. Hall, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 696 days.

(21) Appl. No.: 12/645,936

(22) Filed: Dec. 23, 2009

(65) Prior Publication Data

US 2011/0149060 A1 Jun. 23, 2011

(51) Int. Cl.
*G06F 19/00* (2011.01)
*A61B 8/00* (2006.01)
*G06K 9/00* (2006.01)

(52) U.S. Cl. ............................. 702/84; 600/443; 382/128
(58) Field of Classification Search .................... 702/84; 600/439, 443, 447; 382/128, 293
See application file for complete search history.

(56) References Cited

U.S. PATENT DOCUMENTS 5,873,830 A * 2/1999 Hossack et al. ............... 600/447
6,508,768 B1 1/2003 Hall et al.
2010/0317971 A1 * 12/2010 Fan et al. ....................... 600/439

OTHER PUBLICATIONS

Chen, Lujie, et al., A Quality-guided Displacement Tracking Algorithm for Ultrasonic Elasticity Imaging, Medical Image Analysis 13 (2009), pp. 286-296, Elsevier, Maryland Heights, MO, USA.

* cited by examiner

*Primary Examiner* — Bryan Bui
(74) *Attorney, Agent, or Firm* — Boyle Fredrickson S.C.

(57) ABSTRACT

The identification of preferred seed calculations used to guide the determination of displacement vectors in elasticity imaging may evaluate seeds using a combination of a measure of the similarity of the data of the seed in pre- and post-compression data and continuity of the data in a path in the neighborhood of the seed. This dual evaluation helps avoid downstream error propagation.

20 Claims, 4 Drawing Sheets

ELASTICITY IMAGING DEVICE WITH IMPROVED CHARACTERIZATION OF SEED DISPLACEMENT CALCULATIONS

STATEMENT REGARDING FEDERALLY SPONSORED RESEARCH OR DEVELOPMENT

This invention was made with United States government support awarded by the following agency:
NIH CA100373, CA133488
The United States government has certain rights to this invention.

BACKGROUND OF THE INVENTION

The present invention relates to elasticity imaging including but not limited to strain imaging and in particular to an improved method of determining displacement vectors used to produce such images.

Strain imaging produces images revealing the underlying elastic parameters of the material being measured. When used in medicine, strain imaging is analogous to palpation by a physician, that is, the pressing of tissue by the physician to feel differences in elasticity in the underlying structures.

In a common form of strain imaging, two separate images are obtained with the measured material in different states of deformation, typically, as deformed by an external force. In ultrasound strain imaging, the ultrasound probe itself may be used to provide this deformation.

The two images are analyzed to deduce the amount of displacement in the material at a number of corresponding regions. The gradient in these displacements, determined as a function of the spatial location of the regions, provides strain information generally reflecting the elasticity of the tissue. An example of such strain imaging and a description of techniques for determining displacement of tissue between two images are described in detail in U.S. Pat. No. 6,508,768 and in pending application Ser. No. 12/258,532 filed Oct. 27, 2008 and entitled: Ultrasonic Strain Imaging Device with Selectable Cost-Function, both hereby incorporated by reference.

The displacement between corresponding regions of the material in the first and second state of deformation can be determined by identifying a multi-point region (i.e. a reference kernel) in the material in the first state of deformation and moving this kernel within a two- or three-dimensional search region over a search region of the material in the second state of deformation. The displacement vector is determined by the best match between the reference kernel and its overlapping portion onto the search region of the material in the second state of deformation (i.e. the target kernel). The best match may be determined by evaluating a similarity of the data of the reference and target kernels for example, as a sum of the magnitude of differences between individual samples of these two kernels or other similar technique.

The matching process as used to determine the relative displacement of the material during deformation is subject to an error termed "peak hopping" in which the reference kernel falsely matches to a target kernel in the second image that represents "non-physical" motion, for example, as a result of random noise dominating the similarity determination. Such peak hopping becomes more acute with small kernels (necessary for high resolution imaging) or when there is substantial tissue displacement.

Peak hopping can be reduced by limiting the search region of the kernel based on a priori assumptions about the movement of the tissue, for example, that the trend of displacement in tissue will be continuous over adjacent regions reflecting the continuous nature of the tissue itself. In one implementation of this technique, the location of the search region of a given kernel is guided by the displacement vector of a previously evaluated adjacent kernel.

This assumption of continuity in tissue breaks down for many types of tissue where the tissue is inhomogeneous or where there are sliding interfaces, for example, between organs. Further, use of this of technique, where the evaluation of previous reference/target kernels guides the evaluation of later kernels, can result in "downstream tracking errors" when errors in the evaluation of earlier kernels are propagated downstream to the later kernels and kernels evaluated from those later kernels.

One method for reducing downstream tracking errors was proposed by Chen et al as discussed in "A Quality-Guided Displacement Tracking Algorithm For Ultrasonic Elasticity Imaging" in Medical Image Analysis 13 (2009) 286-296. In the Chen approach, displacement vectors for a computed kernel are used to guide the search region for later kernels only if there are no other displacement vectors that result in higher "quality" between the reference and target kernels. Correlation between the kernels was used by Chen et al. as the measure of quality. In this way, low-quality kernels carry less priority and could be discarded, given the presence of large number of high correlation kernels, thereby reducing the downstream tracking errors. One additional advantage of the Chen approach is that the computation of displacement vectors propagates through kernels in the direction that is flexibly directed by the resultant correlation of the displacement vectors estimated between reference and target kernels. Consequently, if the direction of propagation of the calculation confronts regions with low signal correlation (that might introduce errors) the direction of propagation of the calculations shifts to flow around the low signal correlation regions rather than through them. Because the propagation of the calculation follows the correlation of the data, tissue interfaces tend to be arrived at by calculations propagating from opposite sides of the interface and terminating at the interface rather than passing through the interface such as would introduce downstream tracking errors.

The starting point for the calculation of displacement vectors used in Chen relies upon one or a few "seed" displacement vectors and their associated reference/target kernels spread within the images that are qualified to have high similarity. It is important that these seed displacement vectors and kernels have high correlation between the reference kernel and its best match to the target kernel, because they affect many subsequent calculations and any errors in these seed displacement vectors and kernels will create downstream tracking errors in many other regions. Yet these isolated seed displacement vectors and associated kernels, particularly because of their isolation, are highly susceptible to "peak hopping" errors in which similarity does not reveal an underlying displacement error.

SUMMARY OF THE INVENTION

The present invention provides a method of improving the identification of high quality seed displacement vectors and their associated kernels by evaluating not only similarity (such as correlation) underlying the displacement calculations for those seed kernels but also local continuity. This combined approach greatly reduces the risk of the selected seed kernels having "peak-hopping" errors while preserving the benefits of the Chen technique. In one embodiment, the continuity check computes displacement vectors in a closed path around the candidate seed kernels in a manner constrained by continuity and then evaluates the extent to which continuity has been achieved. In this way, continuity may be evaluated at and around a spatially isolated point.

Specifically then, the present invention provides an elasticity imaging machine having an imaging system adapted to acquire first and second speckle fields in a region of interest of a material with the material in a respective first and second state of deformation. An electronic computer receives the speckle fields from the transducer assembly and executes a stored program to determine a displacement vector for spatially separated first region pairs of corresponding regions in each of the first and second speckle fields, each displacement vector indicating tissue displacement in the region pairs between the first and second state of deformation. The displacement vectors for the region pairs are then qualified with respect to both similarity between the speckle fields in the region pairs and continuity of displacement in neighboring region pairs. The displacement vectors of particular first region pairs are then selected according to their qualification to guide the determination of second displacement vectors in second region pairs surrounding the particular first region pairs.

It is thus a feature of at least one embodiment of the invention to provide a more robust method of identifying the quality of seed kernels that will be used to determine displacement vectors for many other kernels. It is a further feature of at least one embodiment of the invention to reduce the susceptibility of the Chen technique to peak hopping.

The qualification of displacement vectors may evaluate a similarity between the speckle fields in the first region pairs as a similarity between at least a first and second predetermined corresponding neighboring region pair within the regions.

It is thus a feature of at least one embodiment of the invention to make dual use of calculations in neighboring region pairs that are used to qualify continuity as an integral part of quality measure of resultant displacement vectors.

The neighboring region pairs may be arrayed along a path and displacement vectors of the neighboring region pairs calculated so as to promote continuity along the path from a starting neighboring region pair to an ending neighboring region pair adjacent to the starting neighboring region pair, and the qualification of continuity of displacement in first region pairs may evaluate a discontinuity between the displacement vectors of adjacent neighboring region pairs.

It is thus a feature of at least one embodiment of the invention to provide a simple method of assessing continuity for a spatially isolated seed.

The displacement vectors of the neighboring region pairs along the path may be determined by minimizing an energy function accepting as arguments both similarity of the underlying speckle fields of the neighboring region pairs and continuity in displacement vectors between successive neighboring region pairs on the loop.

It is thus a feature of at least one embodiment of the invention to establish a continuity metric that affects a flexible compromise between similarity and continuity.

The energy function may be minimized using a Viterbi algorithm to determine the displacement vectors of the neighboring region pairs.

It is thus a feature of at least one embodiment of the invention to provide a computationally efficient method of establishing the continuity metric.

The first region pairs comprise less than 20% of the speckle fields.

It is thus a feature of at least one embodiment of the invention to provide a system of assessing seed calculations for continuity when the seed kernels are separated substantially from other seed kernels.

The electronic computer or an equivalent digital processing unit may further use displacement vectors of particular second region pairs as new first region pairs according to their qualification to guide the determination of displacement vectors in new second region pairs surrounding the new first region pairs and continue this process, typically, until all displacement vectors at predetermined locations are done.

It is thus a feature of at least one embodiment of the invention to provide a seed qualification system suitable for use with successive repeating calculations where downstream tracking errors are possible.

The successive repeating calculations for each first region pair may be terminated when a combination of the qualification of similarity and continuity for all second region pairs drops below a predetermined threshold.

It is thus a feature of at least one embodiment of the invention to avoid successive repeated calculations through low similarity regions to avoid downstream tracking errors.

Upon the termination of the successive repeating calculations for all first region pairs, remaining region pairs without determined displacement vectors may have displacement vectors derived by interpolation from surrounding region pairs having displacement vectors having at least a predetermined quality.

It is thus a feature of at least one embodiment of the invention to use an approach to regions of low similarity that reduces downstream tracking errors.

The first region pairs may be enrolled in a queue according to their qualification and wherein at each step of repetition, a first region pair is selected from the queue according to qualification to guide the determination of second displacement vectors in second region pairs surrounding selected first region pair.

It is thus a feature of at least one embodiment of the invention to flexibly propagate displacement vector calculations along a path of highest quality or from seed locations of highest quality.

The first region pairs may be selected at nonuniform locations according to an image produced by the imaging system.

It is thus a feature of at least one embodiment of the invention to preferentially locate seeds in areas likely to reduce downstream tracking errors based on image data derived from the system.

The material may be tissue and the electronic computer may further execute the stored program to identify a tissue structure and select the nonuniform locations according to a library of known tissue structures.

It is thus a feature of at least one embodiment of the invention to preferentially locate seeds to reduce downstream tracking errors based on a priori knowledge about tissue anatomy.

The identified nonuniform locations may favor homogenous tissue or tissue with motion continuity.

It is thus a feature of at least one embodiment of the invention to preferentially locate seeds away from inhomogeneities or tissue boundaries which may introduce continuity artifacts affecting either the initial qualification of seed calculations or the propagation of calculations from those seeds.

These particular objects and advantages may apply to only some embodiments falling within the claims, and thus do not define the scope of the invention.

DETAILED DESCRIPTION OF THE PREFERRED EMBODIMENT

Figure 1:
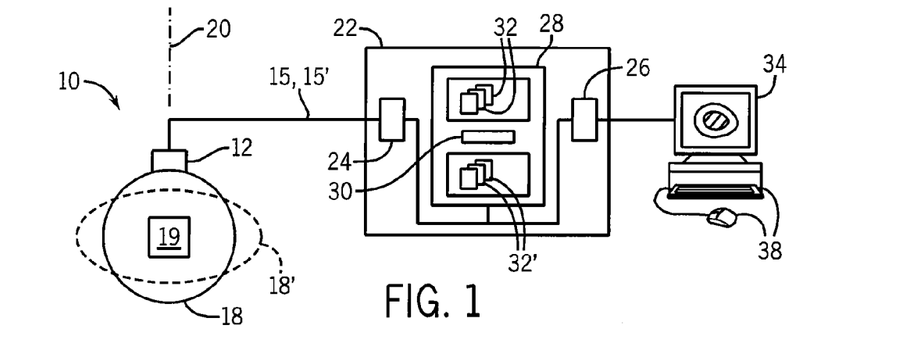
FIG. 1 is a simplified block diagram of an ultrasound machine holding a stored program suitable for execution of the present invention.

Referring now to FIG. 1, a strain-imaging machine 10 of the present invention includes an ultrasonic array transducer 12 that may transmit and receive ultrasonic signals along a propagation axis 20 to acquire ultrasonic echo data 15 at a region of interest 19 in the tissue 18.

In addition to transmitting and receiving ultrasonic signals along the propagation axis 20, the transducer 12 may also provide a source of compression of the tissue 18 along propagation axis 20 in order to acquire additional ultrasonic echo data 15' in the region of interest 19 of deformed tissue 18'. More generally, echo data 15 will be obtained of the tissue 18 in a first state of deformation and echo data 15' will be obtained of the tissue 18' in a second state of deformation that may be more or less deformed than tissue 18.

The transducer 12 may communicate with a processing unit 22 that both provides waveform data to the transducer 12 used to control the ultrasonic beam and collects the ultrasonic echo signals (radio-frequency data) that form the echo data 15, 15'. As is understood in the art, processing unit 22 provides for necessary interface electronics 24 to sample and digitize the ultrasonic echo signals to produce the echo data 15, 15'. The interface electronics 24 operate under the control of one or more processors 26 communicating with a memory 28, the latter of which may store the data of a speckle field 32 associated with echo data 15, and data of a speckle field 32' associated with echo data 15'. These processors 26 will generally implement "electronic computers" a term intended to an embrace not only conventional von Neumann architecture computers, but any electrical circuit capable of executing the algorithms described herein including, for example, digital signal processors (DSPs), field programmable gate arrays (FPGAs), application specific integrated circuits (ASICs) as well as other similar devices.

As will be understood in the art, speckle fields 32 and 32' are generally two- or three-dimensional images that include "speckles" being image characteristics associated with underlying small-scale features to the tissue 18 and 18' that can be used to deduce the displacement of the tissue 18, 18' between states of deformation. For simplicity, speckle field 32 will be termed the pre-deformation speckle field 32 and speckle field 32' will be referred to as the post-deformation speckle field 32'.

The processors 26 may execute a stored program 30 contained in memory 28 to implement the present invention as will also be described below. The processors 26 also may communicate with an output screen 34 on which may be displayed a strain image 36 and may communicate with a keyboard or other input device 38 for controlling the processing unit 22 and allowing for user input as will be understood to those of skill in the art.

Figure 2:
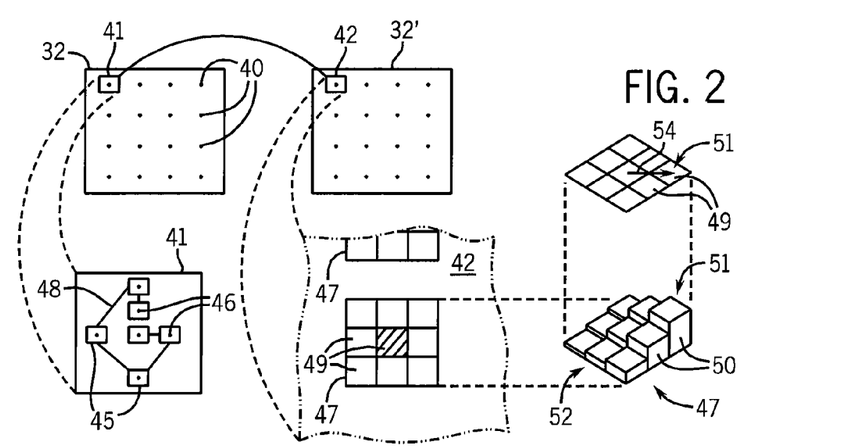
FIG. 2 is a representation of speckle fields in a material in two states of deformation showing the analysis of region pairs to deduce displacement vectors in neighboring region pairs of the region pairs.
Figure 5:
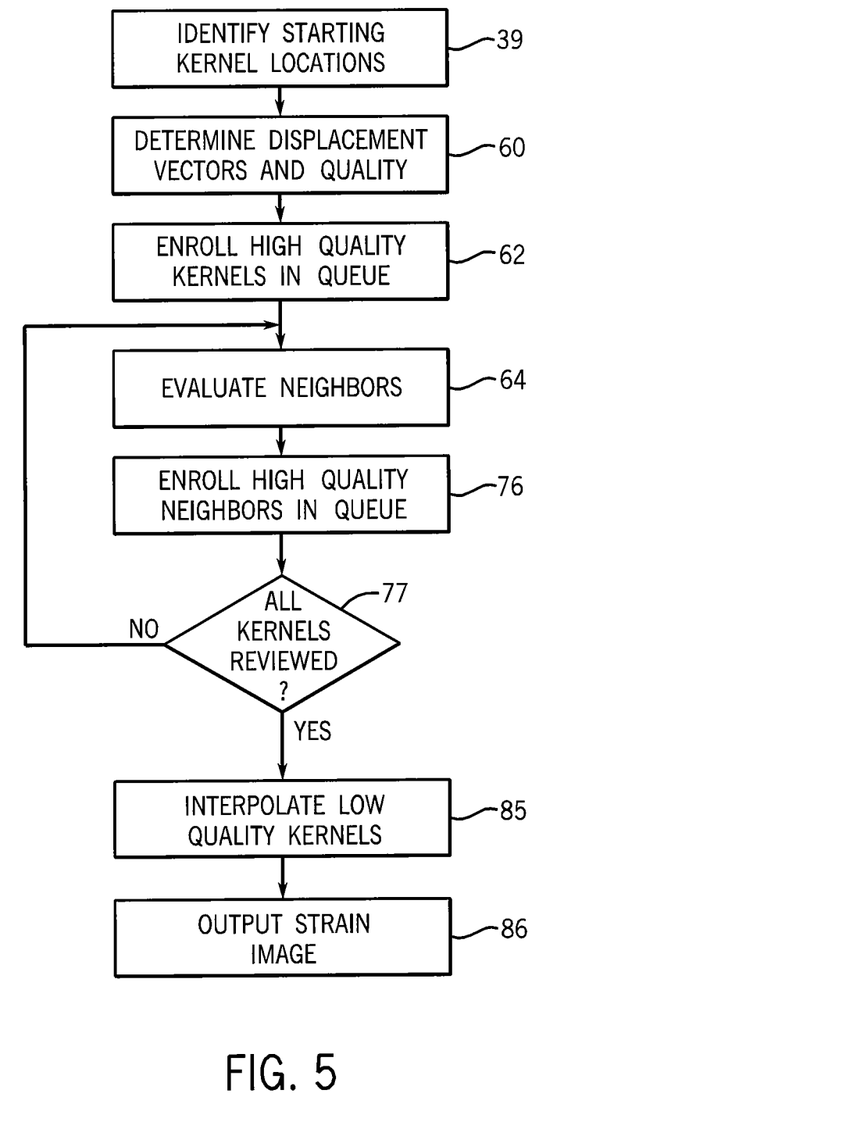
FIG. 5 is a flow chart of steps executed by the programming implementing the calculations of FIGS. 2-4.

Referring now to FIGS. 2 and 5, the program 30 executed by the processors 26 may first identify one or more seed locations 40 in the pre-deformation speckle field 32 indicated by process block 39. Each seed location 40 may define a centerpoint of a kernel neighborhood 41 holding a cluster of reference kernels 45 whose combined areas (or volumes) comprise less than 20% of the area or volume of the pre-deformation speckle field 32. The size (or volume) of kernel neighborhood 41 is likely system-dependent, e.g. in the order of ultrasound pulse area (or volume). The seed locations 40, and hence the kernel neighborhoods 41 of reference kernels 45 (the latter of which are neighboring region pairs), are generally separated from each other and may in one embodiment be uniformly spaced apart.

The data of the pre-deformation speckle field 32 in the reference kernels 45 will be compared to data of the post-deformation speckle field 32' to find a best match that will indicate the relative displacement (displacement vector) of the underlying tissue at each seed location 40 in the pre-deformation speckle field 32 and post-deformation speckle field 32'. In order to avoid the need to examine the entire post-deformation speckle field 32' in matching a given reference kernel 45 to data of the pre-deformation speckle field 32', the matching process will be generally restricted to a search neighborhood 42 in the post-deformation speckle field 32' of predetermined size only slightly larger than the kernel neighborhood 41 and centered at a coordinate within the post-deformation speckle field 32' matching the coordinate of the seed location 40 of the particular kernel neighborhood 41. Ordinarily, the search neighborhood 42 for a particular kernel neighborhood 41 will not overlap the search neighborhood 42 for any other kernel neighborhood 41.

Figure 3:
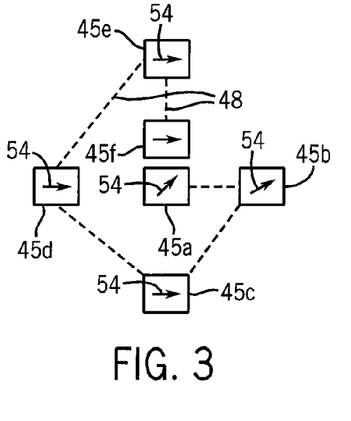
FIG. 3 is a detailed representation of the neighboring region pairs indicating different displacement vectors associated therewith.

Referring still to FIGS. 2 and 3, in this matching process, the data of multiple reference kernels 45 in the kernel neighborhood 41 corresponding to spatial point 46 will compared to the data of corresponding search regions 47 within the search neighborhood 42. In one embodiment, multiple target kernels 45 are used describing a path 48 passing from a starting kernel 45a preferably, but not necessarily, centered within the kernel neighborhood 41 on point 46 and ending at an ending kernel 45f. In one embodiment, the path may lead from the starting kernel 45a and proceed to kernels 45b, being one vertex of a rhombus centered about kernels 45a, and then to kernels 45c, 45d, and 45e forming the other vertices of the rhombus and finally terminating at end kernels 45f within the kite and adjacent to kernel 45a.

Each of these kernels 45 is compared to data of a corresponding search region 47 within search neighborhood 42 of post-compression speckle field 32'. Generally, the search regions 47 will be a pre-determined two or three-dimensional region larger than but corresponding to the positions of the target kernels 45. Alternatively, the search regions 47 may be guided in location by previously calculated displacement vectors for adjacent target kernels 45.

In the matching process, the data of the multiple kernels 45 is moved through the search regions 47 to establish a similarity between the kernel data and the data overlapped by the kernels 45 within the search region 47. The overlapping region between a reference kernel 45 (e.g. 45a) and the search region 47 is also known as a target kernel 49. While the possible locations of the target kernels 49 are depicted for clarity as tiled in discrete non-overlapping locations in FIGS. 2 and 3, in fact, the target kernels 45 may be located anywhere within the search region 47 and this comparison process "slides" the data of the reference kernel 45 over the search regions 47 in increments at or near the resolution of the underlying data.

The similarity 50 of the match between a reference kernel 45 and possible target kernels 49 may be recorded for different locations of the reference kernels 45 within the search region 47 in a similarity map 52. Again, the resolution of the similarity map 52 has been reduced for clarity.

Similarity, as used herein, evaluates the similarity of the underlying data of corresponding pixels of one kernel (e.g. 45a) and the target kernel 49, for example, by summing a magnitude of the differences between the data. The term similarity as used herein is also intended to embrace other techniques of evaluating a matching between the reference kernel 45 and target kernel 49, including, for example, measures of pattern matching between the two kernels or comparisons of the statistics of the data of the two kernels, for example, measures of data entropy or the like. Similarity may be distinguished from measures of continuity as will be described which look data outside of individual reference kernels 45 and target kernels 49.

The location of a peak 51 of the similarity map 52 for the center target kernel 45a may be used to describe a displacement vector 54 for the kernel neighborhood 41 such that the displacement vector 54 has an origin at the center of the search region 47 and a terminus point centered at the location of the peak 51. The height of the peak 51 may be used to characterize a first aspect of the quality of the kernel neighborhood 41, that height indicating the similarity of data underlying the determined displacement vector 54.

Once the displacement vector 54 (hereafter referred as to 54a) is determined based on the peak 51 for the starting kernel 45a, a displacement vector (i.e. 54b) corresponding to the second kernel 45b can be determined by search a reduced search region 47 on the guidance of the displacement vector 54a given the continuity assumption. This checking process proceeds until a displacement vector 54f corresponding to individual kernel 45f is obtained. The degree of difference between displacement vectors 54a and 54f may, in a first embodiment, provide a measure of continuity that augments the measure of similarity as will be described further below. In this embodiment, continuity among displacement vectors 54 is promoted by using previous displacement vectors 54 to guide location of the search regions for later displacement vectors 54.

Figure 4:
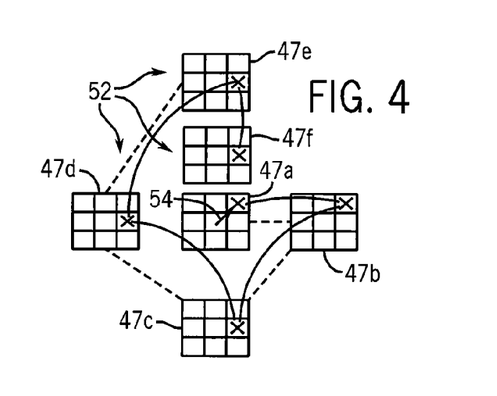
FIG. 4 is a representation of similarity data obtained for each neighboring region pair of region pairs showing the selection of similarity peaks used to derive displacement vectors as constrained by an energy function sensitive to continuity.

Referring now to FIG. 4, in an alternative embodiment, the multiple target kernels 45 may have displacement vector 54 continuity determined using an energy function. For this purpose the displacement vectors 54 are determined for the remaining individual kernels 45b-45f evaluating their similarity maps 52 and the similarity map 52 of search region 47a in succession from the starting search region 47a to search region 47f. The displacement vectors 54 for these other search regions 47b-47f are selected not simply according to the peaks of the similarity maps 52 (as was the case with the displacement vector 54 for search region 47a) but also to promote continuity among adjacent displacement vectors 54 along the path 48 (that is, to reduced the differences in angle and magnitude among adjacent displacement vectors 57 along the path 48). This may be done in one embodiment by minimizing a cost function as follows:

$$\text{COST} = \int\int_{path} (\alpha E_C + \phi E_S)\, d\, path$$

where $\alpha$ and $\phi$ are empirically selected scale factors, $E_C$ is a measure of similarity in the speckle of the regions and $E_S$ is a measure of continuity between adjacent search region 47 displacement vectors 54.

This process of identifying the displacement vectors 54 for each of the successive search regions 47a-f may use an optimization algorithm such as the Viterbi algorithm to rapidly identify a displacement vector 54 for each of the search regions 47b-f.

Again, at the conclusion of this process, collectively indicated by process block 60 of FIG. 5, the displacement vectors 54f and 54a of the starting search region 47a and ending search region 47f are compared to provide a measure of quality of the kernel neighborhood 41 based on continuity. For a high quality kernel neighborhood 41, as measured by continuity, the displacement vectors 54 for these two adjacent regions will be similar or identical. The degree of difference between these displacement vectors 54 for search regions 47a and 47f (and hence for target kernels 45a and 45f) thus provides a measure of continuity that augments the measure of similarity described above.

Continuity, as used herein may alternatively employ other statistical tests such as variance among displacement vectors 54a-f (either in vector angle or vector length or both) and could also be appropriate metrics as measures of continuity. Generally, in contrast to similarity, continuity evaluates data among different target kernels 45 in the kernel neighborhood 41.

Figure 6:
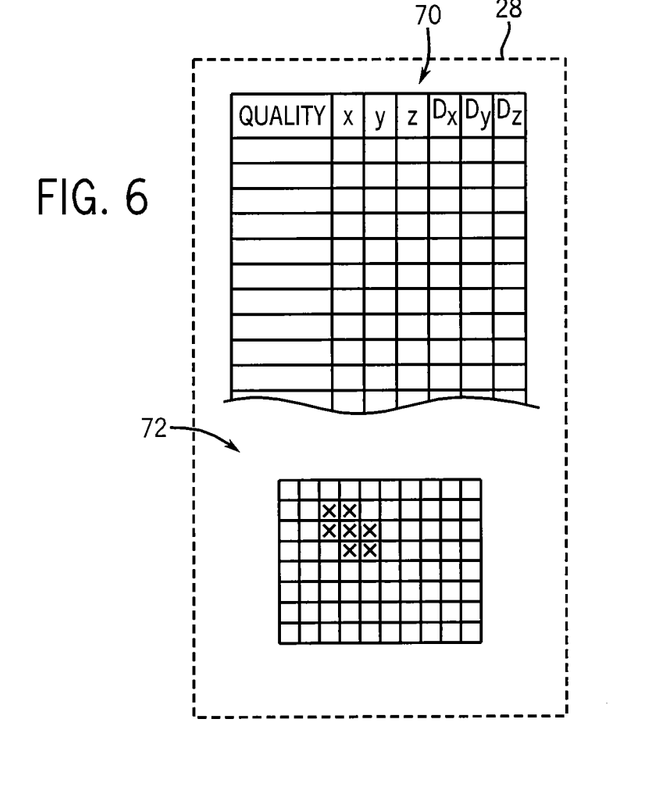
FIG. 6 is a logical representation of a data structures used in the steps of FIG. 5 of seed calculation queue and region calculation punch list.

These two values of continuity and similarity may be combined, for example, by a simple weighted sum and used to provide a quality measurement for each kernel neighborhood 41. The seed locations 40 for those center target kernels 45 of kernel neighborhoods 41 having a quality value above an empirically determined threshold value may then be enrolled in a queue 70 shown in FIG. 6 and as indicated by process block 62 of FIG. 5. The queue 70 logically provides a first column holding the quality measurement for each enrolled target kernel 45 (combining similarity and continuity) together with the coordinates of the seed location 44 of the target kernel 45 in two or three dimensions in the next two or three columns. The displacement vector 54 in two or three dimensions may then be provided in the next two or three columns.

Referring to FIG. 5, at succeeding process block 64, the queue 70 is interrogated to find the highest quality associated with a reference kernel 45 location among all of the enrolled reference kernels 45. The displacement vector 54 for this highest reference kernel 45 is adopted (that is it will be used in a final displacement assessment) and that adoption is indicated in a punch list 72 providing a flag location for each pixel of the speckle field 32 (optionally arranged in kernel-sized units).

At succeeding process block 64, new kernels 45' (shown in FIG. 7) are then constructed from the neighboring pixels of the adopted reference kernel 45 and the quality of these new kernels 45 are evaluated as described above using associated kernel neighborhoods centered around the new kernels 41'. Those new kernels 45', whose quality exceeds the threshold described above, are then enrolled in the queue 70 per process block 76 as new reference kernels 45.

Assuming that displacement vectors 54 have not been adopted for all possible reference kernel 45 in the speckle field 32 meeting the required quality measurements, per decision block 77, the process loops back to process block 64 and the queue 70 is interrogated to find the highest quality new reference kernel 45'. The displacement vector 54 for this highest quality new reference kernel 45' is then adopted and marked in the punch list 72 and the process continues at process block 76 using this highest quality new reference kernel 45' as if it were a reference kernel 45 to evaluate its previously unevaluated neighbors.

The process continues to loop through process (referred to herein a successive repeated calculation) and decision blocks 64, 76, and 77 until all possible reference kernel 45 have been evaluated, some adopted in the punch list 72 and some not.

Figure 7:
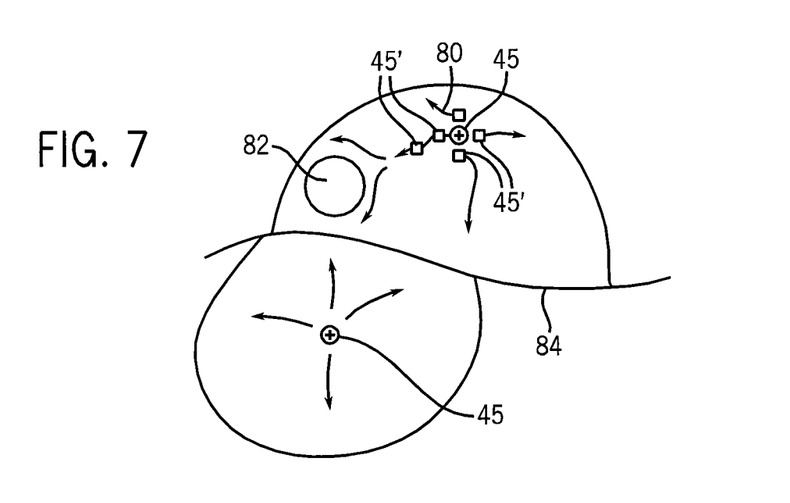
FIG. 7 is a simplified representation of a path of propagation of calculations using the present invention showing avoidance of a low similarity region that may be calculated instead by interpolation.

Referring to FIG. 7, this process of selecting the highest quality reference kernels 45 or 45' in the queue 70 causes a generally radial outward growth in the evaluation of reference kernels 45 from original reference kernels 45 as indicated by arrows 80, the growth following a path of relative highest quality around low correlation regions 82 and typically stopping at tissue interfaces 84 where low similarity or continuity occurs. When multiple seed reference kernels 45 are provided, this growth pattern at a given interface 84 may be approached from two different directions without passing through the interface creating downstream tracking errors. This evaluation may make use of parallel processing on multiple processors.

Referring to FIG. 5, as indicated by process block 85, when there are no more seed reference kernels 45 in the queue 70, the reference kernel 45 that have been evaluated but that have not had displacement vectors adopted as indicated by punch list 72 may be re-evaluated through a different interpolation process using weighted displacement vectors 54 from the surrounding kernels whose displacement vectors 54 were adopted and enrolled in the queue 70. At process block 86 a strain image may be output using the displacement vectors 54 in the queue 70 and as interpolated, the strain image calculated according to well-known techniques.

Figure 8:
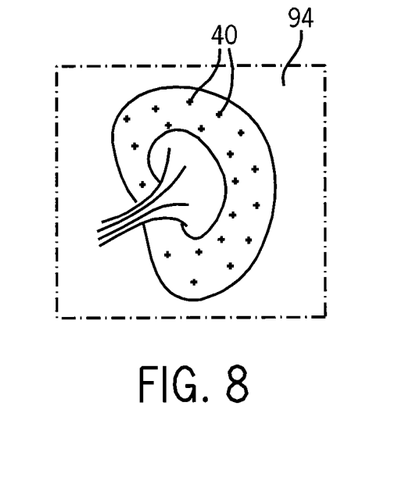
FIG. 8 is a simplified representation of an organ showing nonuniform seed locations avoiding inhomogeneous tissue.

Referring now to FIG. 8, the starting locations 40 for the seeds need not be uniformly arrayed along a grid but maybe opportunistically placed, for example, in regions of tissue homogeneity as determined by an image 94 constructed from the echo data 15 described above. For example, with a kidney, the seed locations 40 would be placed outside of the inhomogeneities caused by, for example, the renal arteries and veins or the renal sinus or regions of coherent tissue motion (e.g., avoiding sliding interfaces between organs). These starting locations 40 may be selected manually by observation of the image 94 or may be identified automatically from the image data using a template or the like. The template may incorporate a priori knowledge about inhomogeneities or discontinuous tissue motion for an organ or tissue type identified from the image data. In some cases, elasticity information itself, taken on a coarse grid or from a previous imaging attempt may guide the placement of the seed locations 40.

Figure 9:
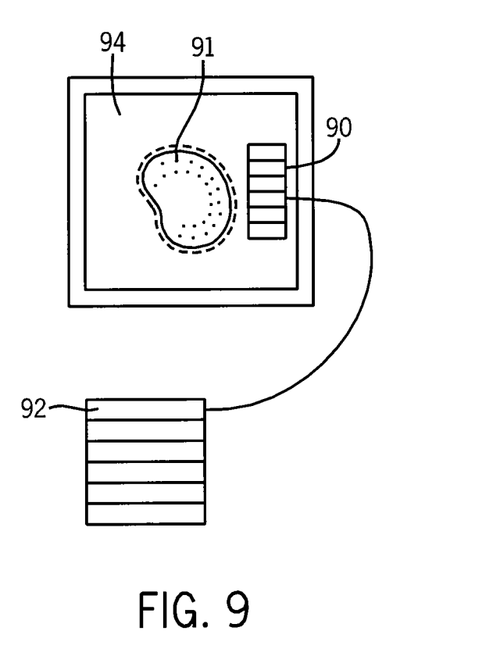
FIG. 9 is a diagram of a user display permitting the selection or confirmation of organ types to invoke templates for nonuniform seed location per FIG. 8.

Referring to FIG. 9, in one embodiment using a template, a physician may select a menu 90, for example, labeled with different organ types to identify a template 92 for a particular organ providing an empirically pre-determined preferred seed location 40 in a mask 91 that may be superimposed over the image 94 and expanded/contracted or rotated to fit to an organ in the image 94 manually or automatically using image recognition techniques.

It is specifically intended that the present invention not be limited to the embodiments and illustrations contained herein, but include modified forms of those embodiments including portions of the embodiments and combinations of elements of different embodiments as come within the scope of the following claims.

We claim:

1. An elasticity imaging machine comprising:
   an imaging system adapted to acquire first and second speckle fields in a region of interest of a material with the material in a respective first and second state of deformation;
   an electronic computer providing an output display and receiving the speckle fields from the imaging system and executing a stored program to:
   (a) determine first displacement vectors for each of spatially separated first region pairs of corresponding regions in each of the first and second speckle fields, each first displacement vector indicating tissue displacement in one of the first region pairs between the first and second state of deformation;
   (b) qualify the first displacement vectors for the first region pairs with respect to both similarity between the speckle fields in the region pairs and continuity of displacement in neighboring region pairs of each first region pair; and
   (c) use the qualified first displacement vectors of selected first region pairs selected according to the qualification to guide the determination of second displacement vectors in second region pairs surrounding the particular first region pairs.

2. The elasticity imaging machine of claim 1 wherein the qualification of displacement vectors evaluates a similarity between the speckle fields in the first region pairs as a similarity between at least a first and second predetermined corresponding portion of the regions of the first region pair.

3. The elasticity imaging machine of claim 1 wherein the neighboring region pairs are arrayed along a path and displacement vectors of the neighboring, region pairs are calculated to promote continuity along the path from a starting neighboring region pair to an ending neighboring region pair adjacent to the starting neighboring region pairs and wherein the qualification of continuity of displacement in the first region pairs evaluates a discontinuity between at least two displacement vector of neighboring region pairs, along the path.

4. The elasticity imaging machine of claim 3 wherein selection of the displacement vectors of the neighboring region pairs along the path are influenced by a selection of the displacement vectors of at least one other neighboring region pair.

5. The elasticity imaging machine of claim 4 wherein selection of the displacement vectors of the neighboring regions pairs is done by minimizing an energy function accepting, as aigurrients both similarity of data underlying the neighboring region pairs and continuity in displacement vectors between successive neighboring region pairs along the path and wherein the energy function is minimized using Viterbi algorithm to determine the displacement vectors of the neighboring region pairs.

6. The elasticity imaging machine of claim 1 wherein the first region pairs comprise less than 20% of the speckle fields.

7. The elasticity imaging machine of claim 1 wherein the electronic computer further qualifies the second displacement vectors in the second region pairs with respect to both similarity between the speckle fields in the second regions pairs and continuity of displacement in neighboring region pairs of the second region pairs and uses displacement vectors of particular second region pairs as new first region pairs according to their qualification to guide the determination of displacement vectors in new second region pairs surrounding the new first region pairs and, repeats this process each time using the displacement vectors of previous second region pairs as the new first region pairs.

8. The elasticity imaging machine of claim 7 wherein the process for each first region pair is terminated when a combination of the qualification of similarity and continuity for all second region pairs drops below a predetermined threshold.

9. The elasticity imaging machine of claim 8 wherein upon the termination of the matching process for all first region pairs, remaining region pairs without determined displacement vectors have displacement vectors derived by interpolation from surrounding region, pairs having displacement vectors having at least a predetermined quality.

10. The elasticity imaging machine of claim 1 wherein the first region pairs are enrolled in a queue according to their qualification and wherein at each step of the matching process a first region pair is selected frum the queue according to qualification to guide the determination of second displacement vectors it second region pairs surrounding selected first region pair.

11. The elasticity imaging machine of claim 1 wherein the first region pairs are selected at nonuniform locations according to an image produce by the imaging system.

12. The elasticity-imaging machine of claim 11 wherein the material is tissue and the electronic computer further executes the stored program to identify a tissue structure and select the nonuniform locations according to a library of known tissue structures.

13. The elasticity imaging machine of claim 11 wherein the nonuniform locations favor at least one of: homogenous tissue and tissue with motion continuity.

14. A method of elasticity imaging using an imaging system adapted to acquire first and second speckle field in a region of interest of a material with the material in a respective first and second state of deformation and having an electronic computer providing an output display and receiving the speckle fields from the imaging system, the electronic computer programmed to execute the steps of:
    (a) determining first displacement vectors for each of first region pairs of corresponding spatially separated regions in each of the first and second speckle fields, each first displacement vector indicating tissue displacement in the regions of one of the first region pairs between the first and second state of deformation;
    (b) qualifying the first displacement vector for each first region pain with respect to both similarity between the speckle fields in the first region pairs and continuity of displacement in neighboring region pairs; and
    (c) using the qualified first displacement vectors of selected first region pairs selected according to the qualification to guide the determination of second displacement vectois in second region pairs surrounding the particular first region pairs.

15. The method of claim 14 wherein the neighboring region pairs are arrayed along a path and displacement vectors of the neighboring region pairs calculated to promote continuity along the path from a starting neighboring region pairs to an ending neighboring region pairs adjacent to the starting neighboring region pair and wherein the qualification of continuity of displacement in first regions pairs evaluates a consistency among at least two displacement vectors of neighboring region pairs along the path.

16. The method of claim 15 wherein the displacement vectors of the neighboring region pairs along the path are determined by minimizing an energy function accepting as arguments both similarity of the underlying speckle fields of the neighboring region pairs and continuity in displacement vectors between successive neighboring region pairs along the path.

17. The method of claim 16 wherein the energy function guides a Viterbi algorithm used to determine the displacement vectors of the neighboring region pairs.

18. The method of claim 14 wherein the first region pairs comprise less than 20% of the speckle fields.

19. The method of claim 14 wherein the first region pairs are selected at nonuniform locations according to an image produce by the imaging system.

20. The method of claim 19 wherein the material is tissue and further including the step of identifying a tissue structure and selecting the nonuniform locations according to a library of known tissue structures.

\* \* \* \* \*

UNITED STATES PATENT AND TRADEMARK OFFICE
CERTIFICATE OF CORRECTION

PATENT NO. : 8,417,475 B2
APPLICATION NO. : 12/645936
DATED : April 9, 2013
INVENTOR(S) : Jingfeng Jiang et al.

It is certified that error appears in the above-identified patent and that said Letters Patent is hereby corrected as shown below:

IN THE CLAIMS

CLAIM 5     Delete "aigurrients" and substitute therefor
Col. 10, Line 62     -- arguments --.

CLAIM 10     Delete "frum" and substitute therefor
Col. 11, Line 29     -- from --.

CLAIM 14     Delete "vec-tois" and substitute therefor
Col. 12, Line 16-17     -- vectors --.

Signed and Sealed this
Eleventh Day of June, 2013

Teresa Stanek Rea
*Acting Director of the United States Patent and Trademark Office*